United States Patent
Swander

(10) Patent No.: US 6,904,529 B1
(45) Date of Patent: Jun. 7, 2005

(54) METHOD AND SYSTEM FOR PROTECTING A SECURITY PARAMETER NEGOTIATION SERVER AGAINST DENIAL-OF-SERVICE ATTACKS

(75) Inventor: Brian D. Swander, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/561,046

(22) Filed: Apr. 28, 2000

(51) Int. Cl.[7] .............................................. G06F 11/30
(52) U.S. Cl. ...................... 713/201; 713/151; 713/200
(58) Field of Search ................................. 713/200, 201, 713/151

(56) References Cited

U.S. PATENT DOCUMENTS 5,923,849 A * 7/1999 Venkatraman .............. 709/224
5,958,053 A * 9/1999 Denker ....................... 713/201
6,330,562 B1 * 12/2001 Boden et al. ................. 707/10

OTHER PUBLICATIONS

"Analysis of a Denial of Service Attack on TCP", Proceedings of the 1997 IEEE Symposium on Security and Privacy, 1997, pp. 208–223.*

Computer Communications 22(10): "TCP/IP Security Threats and Attack Methods", Jun. 25, 1999, 885–97.

"Client Puzzles: A Cryptographic Countermeasure Against Connection Depletion Attacks", Proceedings of the 1999 Network and Distributed System Security Symposium, pp. 151–65.

"Analysis of a Denial of Service Attack on TCP", Proceedings of the 1997 IEEE Symposium on Security and Privacy, 1997, pp. 208–223.

* cited by examiner

*Primary Examiner*—Justin T. Darrow
(74) *Attorney, Agent, or Firm*—Leydig, Voit & Mayer, Ltd.

(57) ABSTRACT

A method and system protects a security parameter negotiation server that stores states for connection requests pending negotiations from malicious denial-of-service attacks that attempt to flood the server with false requests. The degradation of performance of the server is dynamically detected, such as by monitoring the running intervals of a reaper that removes unneeded states. When performance degradation of the system is detected, relevant performance variables such as negotiation delay, extra retransmission delay and packet drop percentage are dynamically adjusted to reduce the workload on the negotiation server. Limiting the number of states with incomplete negotiation status for each client and the total number of such states further enhances the effectiveness of the protection against denial-of-service attacks.

16 Claims, 3 Drawing Sheets

METHOD AND SYSTEM FOR PROTECTING A SECURITY PARAMETER NEGOTIATION SERVER AGAINST DENIAL-OF-SERVICE ATTACKS

TECHNICAL FIELD OF THE INVENTION

This invention relates generally to network communications, and more particularly to security threats to communication servers in a network environment.

BACKGROUND OF THE INVENTION

The Internet has entered the new millenium as the most important computer network of the world. Everyday, millions of people use the Internet to communicate with each other and to gather or share information. Moreover, electronic commerce ("E-commerce") using the World-Wide Web (WWW) of the Internet as its backbone is rapidly replacing and changing the conventional brick-and-mortar stores.

The security of communications through the Internet, however, has always been a major concern. This problem is related to the underlying network communication protocol of the Internet, the Internet Protocol ("IP"), which is responsible for delivering packets across the Internet to their destinations. The Internet Protocol was not designed to provide security features at its level of network communication operation. Moreover, the flexibility of IP allows for some creative uses of the protocol that defeat traffic auditing, access control, and many other security measures. IP-based network data is therefore wide open to tampering and eavesdropping. As a result, it substantial risks are involved in sending sensitive information across the Internet.

To address the lack of security measures of the Internet Protocol, a set of extensions called Internet Protocol Security ("IPSec") Suite has been developed to add security services at the IP level. The IPSec Suite includes protocols for an authentication header (AH), encapsulating security protocol (ESP), and a key management and exchange protocol (IKE). A significant advantage of the IPSec Suite is that it provides a universal way to secure all IP-based network communications for all applications and users in a transparent way. Moreover, as the IPSec Suite is designed to work with existing and future IP standards, regular IP networks can still be used to carry communication data between the sender and recipient. The IPSec Suite is also scalable and can therefore be used in networks ranging from local-area networks (LANS) to global networks such as the Internet.

Even though the IPSec standard provides a comprehensive and robust way to secure network communications against tampering and eavesdropping, the components implementing the IPSec Suite themselves may be subjected to various security threats in the network environment. For instance, the IPSec layer includes a component called an "Internet Key Exchange" ("IKE") server, which is responsible for negotiating with another IKE for security parameters, collectively called a "Security Association" ("SA"), of security operations for securing a given network communication stream. For each secured communication stream, a separate SA has to be negotiated and maintained. Because of the system resources required for handling each communication requests, it is possible for an attacker to construct and send a large number of false communication requests, forcing the IKE server to consume large amounts of system resources. Such an attack potentially can burden the server to the extent that it is no longer able to serve legitimate users.

SUMMARY OF THE INVENTION

In view of the foregoing, the present invention provides a method and system for protecting a network security server for negotiating network security parameters, such as an Internet Key Exchange ("IKE") server of the IPSec suite, from denial-of-service attacks that flood the server with false connection requests. The vulnerability of the security server to such attacks comes from the need for the server to maintain state data for on-going negotiations in response to requests from unknown clients. In accordance with the invention, the resilience of the negotiation server to such attacks is significantly enhanced by dynamically detecting the degradation of the performance of the system, and dynamically adjusting relevant performance variables, such as negotiation delay, retransmission delay, and packet drop percentage, etc., to reduce the states maintained by the negotiation server when performance degradation is detected. A useful indicator of the system health may be the interval between consecutive runs of a reaper for removing states that are no longer useful. To further enhance the effectiveness of the protection against denial-of-service attacks, the maximum number of states pending negotiation responses for outstanding new negotiation requests from a client may be limited, and the total number of stored states pending negotiation responses may also be limited.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
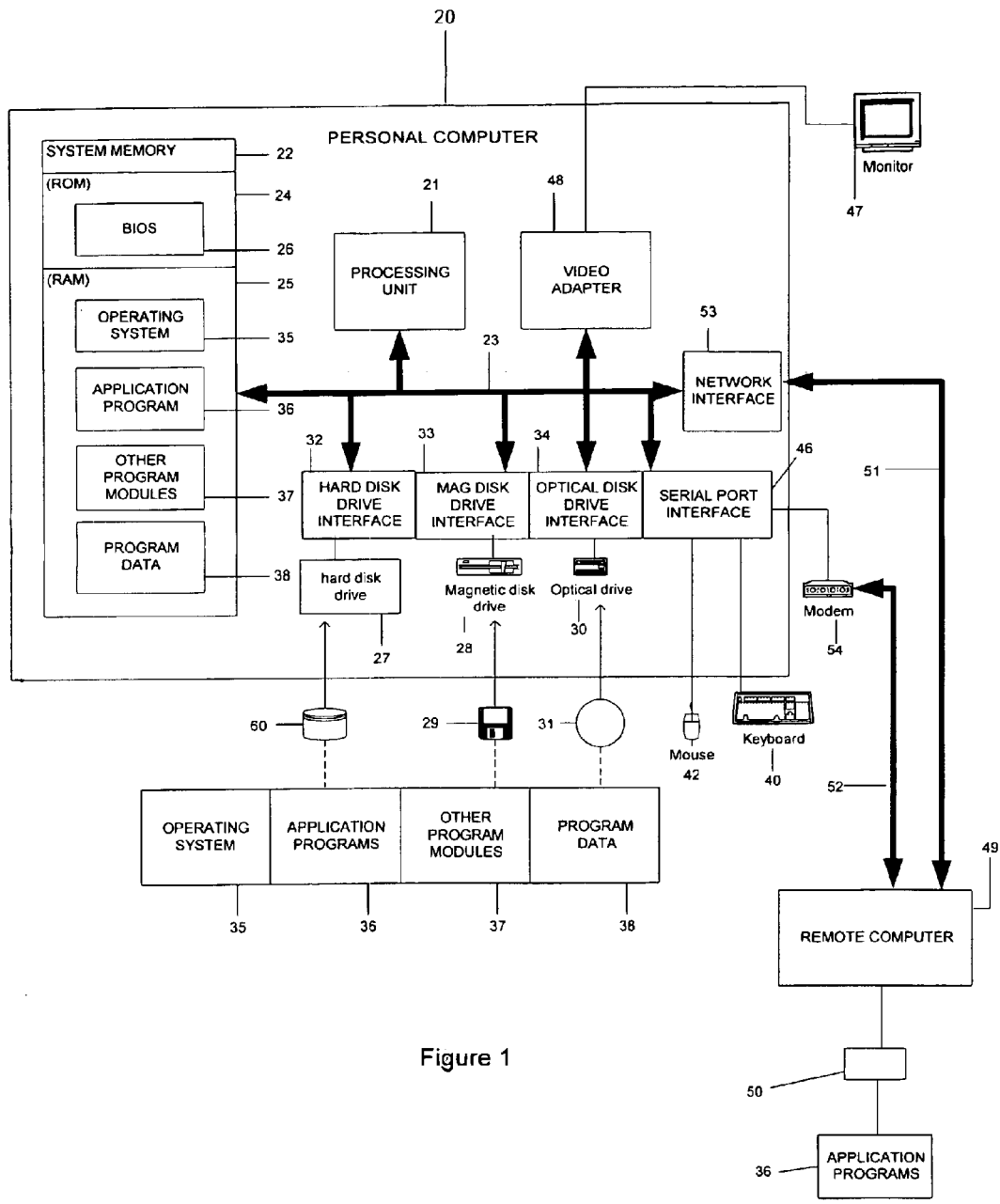
FIG. 1 is a block diagram generally illustrating an exemplary computer system on which the present invention may be reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
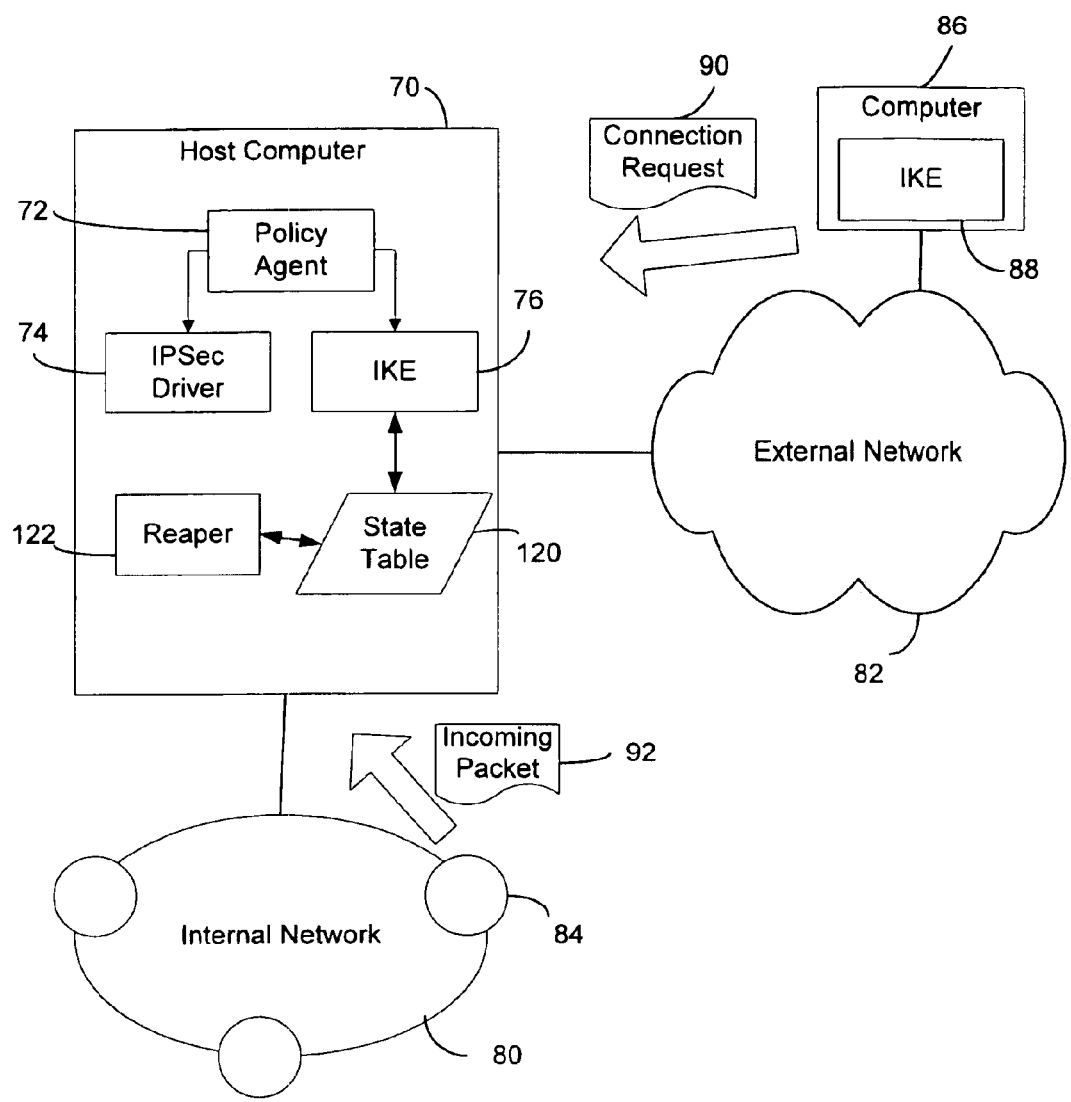
FIG. 2 is a schematic diagram showing a networked computer having a negotiation server for negotiation of security parameters for securing network communications.

Referring now to FIG. 2, the present invention is directed to a way to protect a security parameter negotiation server, such as an IKE server of the IPSec suite, from malicious denial-of-service attacks that attempt to flood the server with false connection requests. For illustration purposes, the invention will be described below in connection with a preferred embodiment that implements the IPSec Suite protocols for secured delivery of network communications. It will be appreciated, however, that the system and method of the invention for providing protection against denial-of-service attacks can also be effectively used with other network security protocols that require negotiations of security parameters for securing network communications.

In the embodiment shown in FIG. 2, a computer 70 implements the IPSec Suite protocols for secured delivery of IP-based packets. The components supporting the IPSec protocols include a policy agent 72, an IPSec driver 74, and an Internet Key Exchange ("IKE") server 76. The security policies assigned to the host computer 70 by the administrator of the system determine the levels of security for various types of communications. The security policies are picked up by the policy agent 72 and passed the IKE server 76 and the IPSec driver 74. The IKE server 76 uses the negotiation policies associated with the assigned security policies to conduct negotiations with a peer (i.e., the IKE component of another computer on the network) to establish security parameters for communications with the host of the peer. The negotiated security parameters include, for example, the parameters for authentication and encryption methods and the keys, and are collectively referred to in the IPSec Suite protocols as a Security Association ("SA"). The results of the negotiation by the IKE server 76 is passed to the IPSec driver 74, which performs security operations, such as data encryption, on packets of a communication stream using the negotiated SA for that stream.

In this illustrated embodiment, the host computer 70 on which the IPSec components reside is part of an internal network 80 such as a local-area network ("LAN"). The host computer 70 is also connected to an external network 82, such as the Internet, and communicates with other computers on the external network by sending and receiving packets based on the Internet Protocol. The host computer 70 in this arrangement functions as a firewall or gateway for computers on the internal network 80 to communicate with computers on the external network 82. For example, a computer 84 on the internal network may communicate with a computer 86 on the external network 82 by transmitting IP-based communication packets 92 through the host computer 70, whose IPSec components will handle the task of securing the communication stream. When the host computer is used in this capacity of a gateway for the internal network, the IPSec components, such as the IKE server 76, especially have to be resilient to attacks mounted by malicious attackers on the external network while providing services to legitimate users.

In accordance with an aspect of the invention, the IKE server 76 may be vulnerable to denial-of-service attacks that flood it with false connection requests if no special protection measure is taken. The vulnerability of the IKE server to such flooding attacks comes from the need for the IKE server to store states not only for successful negotiations but also for on-going negotiations. As shown in FIG. 2, when an initial communication request 90 comes from a computer 86 on the external network 82, the IKE server 76 initiates a negotiation process with the peer IKE 88 of the requesting computer 86 to establish the security parameters for the communication. Under the IKE protocol of the IPSec suite, this negotiation involves two phases. In the first phase, the two IKE peers 76 and 88 establish a secure channel for conducting the IKE negotiation (called the IKE SA). In the second phase, the two IKE peers negotiate general purpose SAs over the secure channel established in the first phase. The first phase is typically accomplished in a "main mode" that involves three two-way exchanges between the SA initiator and the recipient. The second phase is accomplished in a "quick mode" that is less complicated than the main mode since the negotiation is already inside a secure channel. As these phases and modes of the IKE negotiation process are defined in the IKE protocol and well known to those skilled in the art, it is not necessary to describe them in greater detail here.

It is important, however, for purposes of the invention to understand that to support the negotiation process the IKE server has to store a "state" associated with the negotiation. Specifically, when a request 90 for a new negotiation with a peer arrives, the IKE server allocates system resources to create a state for the negotiation. In this context, the state is a proposed SA to be established by negotiation. As shown in FIG. 2, the IKE server 76 maintains a state table 120 that is a list of all SAs pending negotiation as well as SAs that have been successfully negotiated. The resources allocated for the SA state include dynamically allocated memory and a critical section for synchronization. The SA state record starts with data including the peer address, an indication of whether the server is the initiator or responder of the negotiation, the current state of the negotiation (e.g., an OAK_MM_SETUP state as will be described below). As the negotiation proceeds, more information is filled into the SA state, such as the key generation data, the negotiation attributes, the authentication material, etc. At the end of the main mode phase of the negotiation, the SA is fully filled out.

It is important to note that at the time the SA state is created in response to a negotiation request, the IKE does not know whether the request is really from the peer computer identified in the request. After creating the state for the new negotiation request, the IKE server processes the request to see whether it is valid, and then responds if the request is valid. The rest of negotiation then follows, with four more round trip packet exchanges. Part of this exchange authenticates the peer, and at that time the IKE can determine if it should allow access to that peer. This peer authentication does not occur until the third round trip, however. In short, the IKE server has to create a state immediately in response to a request from any unknown source, and the peer authentication takes place later. Thus, a malicious user of the peer computer can send in a large number of requests to force the IKE sever to create a large number of states. This consumes system resources, making the system to run slower. As the system runs slower, it cannot reclaim resources quickly, causing the system to run even slower and finally coming to a grinding halt.

In accordance with the invention, the resilience of the IKE server to the denial-of-service attack is significantly improved by dynamically detecting when the performance of the system begins to degrade, and adjusting performance variables to actively remove unneeded states and reduce the workload of the IKE server. The effectiveness of the protection against denial-of-service attacks is further enhanced and the ability of the server to serve legitimate requests is improved by limiting the number of states for pending negotiations for each client and the total number of such states. These protective measures are described in greater detail in the following description.

In accordance with a feature of the embodiment, the activation periodicity of a reaper component 122 of the system is used as a primary barometer for the system health. The function of the reaper 122 is to remove unwanted states from the state table 120 of the IKE server 76. The reaper is scheduled to run at fixed intervals, although the actual intervals between consecutive runs of the reaper would depend on the system workload. For instance, in a multi-threading system, the reaper thread may be scheduled to run every 45 seconds. On a lightly loaded system, the reaper thread will be activated at or close to the scheduled time. When the system is under a heavy workload, however, the operating system may fall behind its schedule and activate the reaper later than the scheduled time. As a result, the interval between two consecutive runs of the reaper becomes longer than 45 seconds. As the workload of the system becomes heavier, the intervals between consecutive runs of the reaper are likely to increase. The delay in the activation of the reaper thus serves as a reliable indicator of whether the system is being overloaded.

When the reaper activation intervals become longer than the scheduled interval, dynamic adjustments of relevant performance variables are made to reduce the load on the system. In a preferred embodiment, the performance variables that affect the operation of the IKE server include negotiation delay, retransmission delay, and packet drop percentage. The negotiation delay controls how long a negotiation process is allowed to last. By reducing the negotiation delay, pending negotiations are timed out sooner, and their associated SAs are removed from the state table 120. The retransmission delay is the time the IKE server 76 will wait for a response from the requesting computer before retransmitting a packet in the negotiation process. Increasing the retransmission delay makes retransmissions further apart. As a result, the system makes fewer retransmissions per unit time, thereby reducing the workload on the system. The packet drop percentage is the percentage at which the incoming negotiation packets are randomly dropped. Increasing the packet drop percentage means that the system handles fewer requests and therefore does less work. Adjusting these performance variables to reduce the system workload allows the system to heal itself from a burst of attack and to withstand short loads that far exceed its normal capacity. It will be appreciated that other performance variables that have direct or indirect impacts on the workload of the system may also be adjusted to lessen the overloading of the system.

Figure 3:
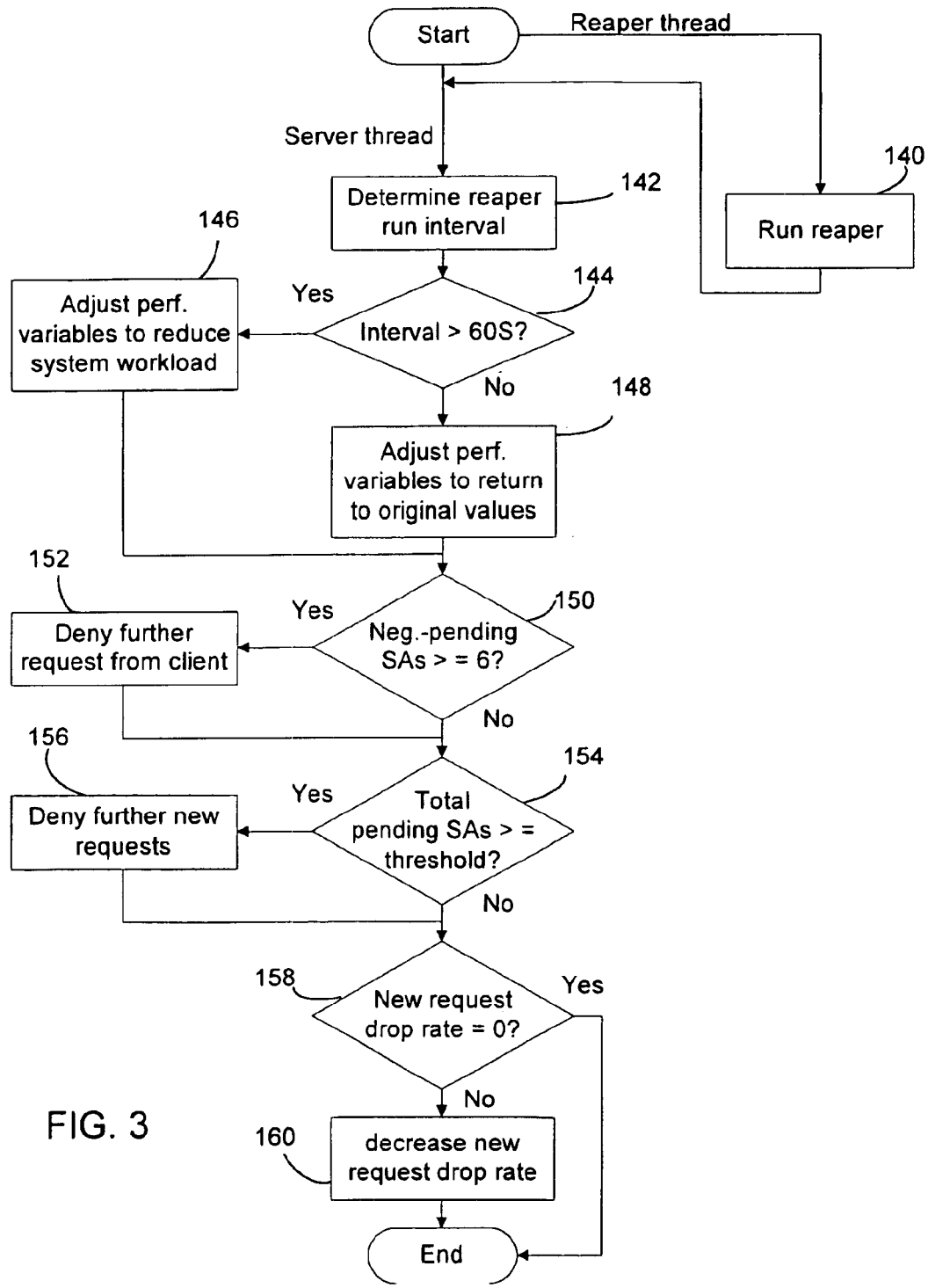
FIG. 3 is a flow diagram showing a process embodying a method of the invention for protecting the negotiation server against denial-of-service attacks.

The adjustments of the performance variables are preferably made in a progressive manner such that they are gradual at first and become more drastic as the system overloading becomes more severe. By way of example, referring to FIG. 3, each time the reaper thread is activated (step 140), the interval between the present run and the previous run is determined (step 142). In this example, the reaper 122 is scheduled to run at an interval of 45 seconds. If the reaper actually runs at an interval equal to or greater than 60 seconds (step 144), the performance variables are modified to reduce the workload of the system (146). After the reaper run interval returns to the range between 60 seconds and 45 seconds, the performance variables may be modified in the opposite direction to allow them to move back toward their initial values (step 148). For instance, in one implementation, the negotiation delay has a minimum value of 30 seconds and a maximum value of 60 seconds. Each time the reaper run interval exceeds 60 seconds, the negotiation delay is decreased by 5 seconds. After the reaper run interval returns to below 60 seconds, the negotiation delay is increased by one second for each reaper run. Similarly, the transmission delay may have a minimum of 0 second and a maximum of 15 seconds, with an increment step of 3 seconds and a decrement step of 1 second. The drop packet percentage has a minimum of 0 and a maximum of 100, with increment and decrement steps of 3 and 5, respectively. Also, the packet drop percentage starts to be incremented only if the negotiation delay is already at its minimum. In this way, the IKE server avoids dropping packets until it becomes necessary to do so.

Adjusting performance variables to reduce the system workload as described above is effective in preventing the IKE server from being paralyzed by a flooding attack. Nevertheless, since those performance variables are global, the workload reduction does not discern valid clients from potentially malicious attackers. As a result, the server will equally deny service to valid users and malicious attackers. In this regard, the protection against denial-of-service attacks in a preferred embodiment is made more focused on potential attackers by limiting the number of states pending negotiation for each client. By way of example, the number of outstanding requests for each client may be limited to a selected number, such as 6. When it is detected that a client already has 6 or more states pending negotiation (step 150), the thread that processes negotiation requests simply drops any subsequent new request from the same client as identified by the IP address of the request (step 152). This eliminates the possibility of being flooded by false requests generated by an attacker on a single machine.

It is, however, possible for an attacker to put fake source IP addresses in the false requests (which is commonly called "spoofing"). To deal with that possible scenario, in a preferred embodiment a configurable threshold (e.g., 1000) is also set for the total number of states pending negotiation. Specifically, when the IKE server 76 sends a response to a new request for negotiation, the state it allocates is marked to indicate that the negotiation for this state is not completed, such as by setting a flag named "OAK_MM_SETUP". This setting is not changed unless the IKE server receives a valid response from the client that sent the request. In the case of spoofing, since source IP addresses of the false requests are fake, it is unlikely that the attacker would receive the negotiation packets from the IKE server and respond accordingly. Thus, the total number of states with pending negotiations is an indicator of the possibility that the IKE server is under a flooding attack.

When the reaper runs, it checks the total number of states with the negotiation-pending flag set. If the total number exceeds the pre-configured threshold (step 154), the IKE server is told not to accept any new connection request (step 156) and to more aggressively time out those negotiation-pending states. In this way, valid connections are given the opportunity to progress (i.e., to complete the negotiations), and once the negotiations are successfully completed, they are not affected by the attack. In a preferred embodiment, when it is determined that the total number of states pending negotiation has been reduced to below the threshold (step 154), the IKE server does not immediately accept all new requests but rather gradually allows new requests in. In other words, a portion of the new requests may still be dropped. For example, the new request drop rate may be set to 100%, 25%, or 0%. If the total number of negotiation-pending states is below the threshold but the new request drop rate is not 0 (step 158), the IKE server may reduce the drop rate to the next lower level, such as from 100% to 25 or from 25% to 0 (step 160).

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having thereon computer-executable instructions for providing protection against denial-of-service attacks in a computer system comprising a negotiation server for negotiating security parameters for securing network communications, the negotiation server maintaining a state table for storing states in response to connection requests, the computer-executable instructions comprising instructions for:

counting a total number of negotiation-pending states in the state table of the negotiation server;

rejecting new connection requests when the total number of negotiation-pending states reaches a threshold number; and reducing a new request drop rate toward zero when the total number of negotiation-pending states is less than the threshold number.

2. A computer-readable medium as in claim 1, further comprising instructions for adjusting a negotiation delay variable to reduce workload of the negotiation server.

3. A computer-readable medium as in claim 1, further comprising instructions for adjusting a retransmission delay variable to reduce workload of the negotiation server.

4. A computer-readable medium as in claim 1, further comprising instructions for adjusting a packet drop percentage variable to reduce workload of the negotiation server.

5. A computer-readable medium as in claim 1, wherein the negotiation server is an Internet Key Exchange ("IKE") server under the IPSec protocols, and wherein the states maintained by the negotiation server are Security Associations ("SA") under the IPSec protocols.

6. A computer-readable medium having thereon computer-executable instructions for providing protection against denial-of-service attacks on a computer system in which a negotiation server for negotiating security parameters for securing network communications resides, the negotiation server maintaining a state table for storing states in response to connection requests, the instructions comprising instructions for:

monitoring a run interval of a reaper component for removing unwanted states in the state table; and when the run interval of the reaper exceeds a preconfigured time period, adjusting first and second performance variables relating to maintenance of the state table to reduce workload of the negotiation server, adjusting the first performance variable only after the second performance variable has reached an adjustment limit thereof.

7. A computer-readable medium as in claim 6, wherein the first performance variable is a packet drop percentage rate and the second performance variable is a negotiation delay variable.

8. A computer-readable medium as in claim 6, having further computer-executable instructions for performing the step of reverting the performance variables toward their respective original settings when the run interval of the reaper shows alleviation of degradation of the performance of the computer system.

9. A method for providing protection against denial-of-service attacks in a computer system comprising a negotiation server for negotiating security parameters for securing network communications, the negotiation server maintaining a state table for storing states in response to connection requests, the method comprising:

counting a total number of negotiation-pending states in the state table of the negotiation server;

rejecting new connection requests when the total number of negotiation-pending states reaches a threshold number; and reducing a new request drop rate toward zero when the total number of negotiation-pending states is less than the threshold number.

10. The method as in claim 9, further comprising adjusting a negotiation delay variable to reduce workload of the negotiation server.

11. The method as in claim 9, further comprising adjusting a retransmission delay variable to reduce workload of the negotiation server.

12. The method as in claim 9, further comprising adjusting a packet drop percentage variable to reduce workload of the negotiation server.

13. The method as in claim 9, wherein the negotiation server is an Internet Key Exchange ("IKE") server under the IPSec protocols, and wherein the states maintained by the negotiation server are Security Associations ("SA") under the IPSec protocols.

14. A method for providing protection against denial-of-service attacks on a computer system in which a negotiation server for negotiating security parameters for securing network communications resides, the negotiation server maintaining a state table for storing states in response to connection requests, the method comprising:

monitoring a run interval of a reaper component for removing unwanted states in the state table; and when the run interval of the reaper exceeds a preconfigured time period, adjusting first and second performance variables relating to maintenance of the state table to reduce workload of the negotiation server, adjusting the first performance variable only after the second performance variable has reached an adjustment limit thereof.

15. The method as in claim 14, wherein the first performance variable is a packet drop percentage rate and the second performance variable is a negotiation delay variable.

16. The method as in claim 14, further comprising reverting the performance variables toward their respective original settings when the run interval of the reaper shows alleviation of degradation of the performance of the computer system.

* * * * *